United States Patent [19]

Hori

[11] Patent Number: 4,532,224
[45] Date of Patent: Jul. 30, 1985

[54] COMPOSITE CERAMIC POWDERS AND A METHOD OF MAKING THE SAME

[75] Inventor: Saburo Hori, Chiba, Japan

[73] Assignee: Kureha Chemical Industry Co., Ltd., Tokyo, Japan

[21] Appl. No.: 562,725

[22] Filed: Dec. 19, 1983

[30] Foreign Application Priority Data

Jan. 14, 1983 [JP] Japan ................................. 58-3336

[51] Int. Cl.³ ...................... C04B 35/10; C04B 35/48
[52] U.S. Cl. .................................... 501/105; 501/153
[58] Field of Search ................ 501/105, 153; 427/213

[56] References Cited

U.S. PATENT DOCUMENTS

| 3,663,283 | 5/1972 | Hebert et al. | 423/613 |
| 3,730,748 | 5/1973 | Lailach et al. | 106/299 |
| 3,891,408 | 6/1975 | Rowse et al. | 501/105 |
| 4,285,732 | 8/1981 | Charles et al. | 501/153 |
| 4,314,827 | 2/1982 | Leitheiser | 501/105 |
| 4,316,964 | 2/1982 | Lange | 501/105 |
| 4,429,051 | 1/1984 | Davidge et al. | 501/105 |
| 4,491,482 | 1/1985 | Hori | 501/105 |

Primary Examiner—Helen M. McCarthy
Attorney, Agent, or Firm—Wenderoth, Lind & Ponack

[57] ABSTRACT

Composite ceramic powders comprising tetragonal zirconium oxide dispersed in fine particles of aluminum oxide, and a method of making such composite ceramic powders.

3 Claims, 4 Drawing Figures

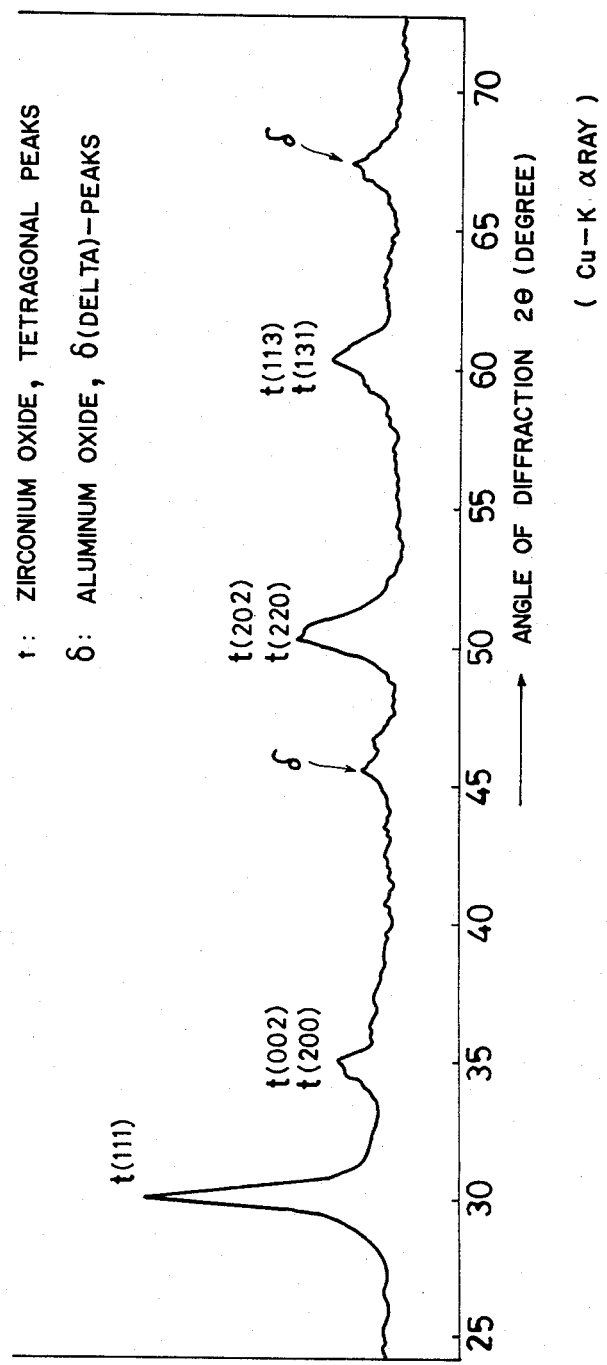

COMPOSITE CERAMIC POWDERS AND A METHOD OF MAKING THE SAME

BACKGROUND OF THE INVENTION

This invention relates to composite ceramic powders and a method of making the same wherein zirconium oxide exhibits only the tetragonal crystalline phase in aluminum oxide by finely dispersing zirconium oxide crystallites within fine particles of aluminum oxide. This invention provides ceramic powder raw material capable of obtaining zirconia dispersed ceramics having excellent mechanical strength wherein zirconium oxide particles are uniformly and finely dispersed in an aluminum oxide matrix, when such composite ceramic powders are used as a raw material.

Ceramic sintered bodies having zirconium oxide particles finely dispersed in other ceramic matrices are called Zirconia Dispersed Ceramics (abbreviated as ZDC). It is known that the addition of zirconium oxide (zirconia) significantly increases toughness. (For example, "Bulletin of the Ceramic Society of Japan" Vol. 17 (1982), No. 2, pp 106–111 and Japanese Patent Laid-Open Pub. No. 86413/1977) It is believed that the reason why toughness is generated is as follows: finely dispersed zirconium oxide particles are present in the form of a tetragonal symmetry in a ceramic matrix and this tetragonal zirconium oxide is transformed into a monoclinic symmetry when rupture cracks are propagated. In order for zirconium oxide to exhibit a tetragonal symmertry in the ceramic matrix, its size must be smaller than the critical particle diameter. For example, when zirconium oxide is present in an aluminum oxide (alumina) matrix, it is said that the critical particle diameter of zirconium oxide is the order of 5000 Ångströms. Toughness is scarcely enhanced unless zirconium oxide having sufficiently small diameter is dispersed. Accordingly, in order to prepare zirconia dispersed ceramics having high toughness, it is necessary to consider which way the finely zirconium oxide can be dispersed in producing raw material powder.

An example of zirconia dispersed ceramics is an aluminum oxide-zirconium oxide system. One well-known method to prepare this system is such that raw material powders are prepared by mechanically pulverizing and mixing aluminum oxide and zirconium oxide. It is difficult by this method to prepare sintered bodies wherein zirconium oxide having a particle size of 5000 Ångströms or smaller is dispersed, unless the raw material powders, particularly zirconium oxide is sufficiently small. Even when zirconium oxide is sufficiently small, the mixing may not be sufficient enough to provide a good result. When zirconium oxide is locally agglomerated due to insufficient mixing, the agglomerates grow to coarse particles by sintering, and may lead to reduction in strength in many cases. In another method known in the art, water-soluble aluminum and zirconium salts are dissolved in water; the aqueous solution is made basic by the addition of ammonia and the like to simultaneously precipitate aluminum hydroxide and zirconium hydroxide; and these precipitates are calcined to form mixed powders of aluminum oxide and zirconium oxide. In the case of this method, the calcination results in the growth of particles and the aggregation between particles becomes significant. Thus, the ceramic raw material powders obtained in this method do not meet two requirements that the powders should have (i.e., fine particle size and good dispersibility), and therefore it is difficult to obtain dense sintered bodies by this method.

A further method is known in the art which comprises the steps of using an aluminum alkoxide and a zirconium alkoxide to form a uniform sol, heating the sol to form a gel, sufficiently drying the gel, then pulverizing it, and thereafter molding and sintering. (For example, see J. Am. Ceram. Soc., Vol. 61, No. 1 (1981) pp 37–39). While this method provides good dispersion of the zirconium oxide, the operations are complex and the method is not preferred from the standpoint of economy.

In sintered bodies of aluminum oxide having zirconium oxide dispersed therein which are prepared by the prior art methods as described above, it is very difficult to prepare sintered bodies wherein zirconium oxide particles are sufficiently small in size and wherein the majority of the zirconium oxide particles are in a tetragonal symmetry. We have carried out studies with respect to the raw material powders from which molded sintered bodies having excellent mechanical strength can be relatively readily prepared such that zirconium oxide is uniformly finely dispersed in aluminum oxide and wherein the majority of zirconium oxide particles are in a tetragonal symmetry, and thus have arrived at the present invention.

SUMMARY OF THE INVENTION

The present invention relates to composite ceramic powders comprising fine particles of aluminum oxide and zirconium oxide crystallites dispersed in the aluminum oxide wherein the zirconium oxide exhibits a tetragonal crystalline phase. Such powders can now be prepared by a novel method discovered by the present inventor.

BRIEF DESCRIPTION OF THE DRAWINGS

FIG. 4 is an X-ray diffraction pattern of the powders shown in FIG. 2.

DETAILED DESCRIPTION OF THE INVENTION

Figure 1:
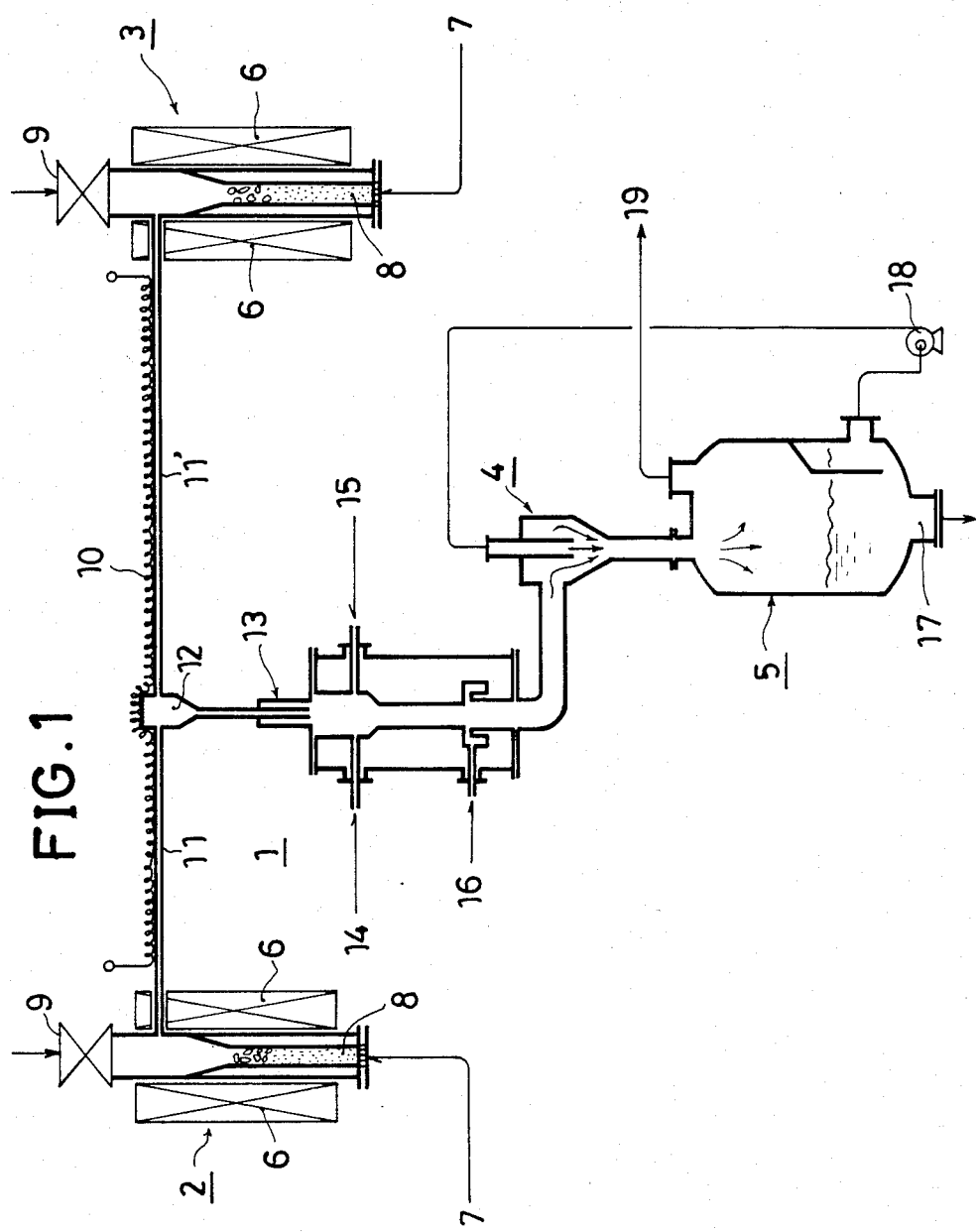
FIG. 1 is a view illustrating the scheme for producing composite ceramic powders according to the present invention.

When a vapor mixture of aluminum halide and a zirconium halide are oxidized in a high temperature oxidizing atmosphere such as an oxyhydrogen flame, there are obtained fine particles having an average size of from about 200 to about 1000 Ångströms wherein aluminum oxide is uniformly mixed with zirconium oxide. However, in conventional methods, it is impossible to prepare powders wherein zirconium oxide is dispersed within fine particles of aluminum oxide in only a tetragonal crystalline phase. In the past we have filed Japanese Patent Appln. No. 50541/1982. This application relates to composite ceramic powders different from the present invention. The aforementioned application teaches that when aluminum chloride and zirconium chloride raw materials are used and the relative blowing positions of two raw material gases are adjusted, the amount of the resulting tetragonal zirconium oxide is increased and the strength of sintered bodies is increased. The application described above teaches that this is because of the formation of double structure comprising a zirconium oxide core portion and an aluminum oxide shell portion.

While the blowing (of) two raw material gases from the same nozzle is expected to provide better mixing, it was impossible at that time to carry out such a operation due to the following reasons. In the case of the evaporator previously used, the contact of a carrier gas with aluminum chloride or zirconium chloride was inferior and therefore the evaporators having a large volume were used and a large amount of aluminum chloride or zirconium chloride was charged into the respective evaporator. Because these two evaporator outlets were connected each other the gas flow became intermittent, and only aluminum chloride was blown into the reaction vessel at one time, while only zirconium chloride was blown into the reaction vessel at the other time. Thus, it was impossible to maintain a good operation. In order to overcome this drawback, the present inventor has modified the evaporation in order that small-size evaporators can be used and constant evaporation can be carried out. Even if aluminum chloride and zirconium chloride are blown from the same nozzle, a constant amount of raw materials having a constant composition can always be blown in the reaction vessel and subjected to an oxidation reation in an oxyhydrogen flame to form powders wherein aluminum oxide and zirconium oxide are uniformly mixed with each other. The powders prepared by using this apparatus are spherical powders. The average particle size thereof is from 200 to 1000 Ångströms. When these powders are measured by means of a conventional X-ray diffraction method, in the case of powders wherein the content of zirconium oxide is 25% by weight or less, only tetragonal peaks are observed as zirconium oxide and no monoclinic peak is observed. While the crystalline phase of aluminum oxide is less clear, it is believed that aluminum oxide be amorphous or δ (delta)-aluminum oxide.

It is known that the diameter of crystallite can be estimated from the width of X-ray diffraction peaks. Its method is described, for example, in L. V. Azaroff "Elements of X-ray Crystallography" pp 562-571. Maruzen (Japan) (1973) (translated by Hirabayashi and Iwasaki; the original text published by McGraw-Hill, New York (1968)) and uses the Scherrer's formula;

$$D = \frac{K\lambda}{\beta_{cs} \cos\theta}$$

wherein D represents the diameter of crystallite, K represents a constant, λ represents the wavelength of X-ray, $\beta_{cs}$ represents a corrected half value width and θ represents a Bragg scale.

As can be seen from the Scherrer's formula, when the width of X-ray peak is wide, it is estimated that the diameter of crystallite is small.

In the case when the composite powder of aluminum oxide and zirconium oxide was prepared by flowing aluminum chloride and zirconium chloride from the same nozzle, the crystallite diameter of zirconium oxide calculated by the above formula was the order of from about 40 Ångströms to 80 Ångströms. The observation by transmission electron microscopy exhibited an average particle size of from 200 Ångströms to 1000 Ångströms. Little or no particles having a particle size of 100 Ångströms or smaller were present. Accordingly, it is recognized that zirconium oxide particles having a crystallite diameter of from 40 Ångströms to 80 Ångströms are finely dispersed within aluminum oxide particles having a size of several hundreds of Ångströms. It is said that zirconium oxide particles exhibit a tetragonal symmetry when the particles size thereof is smaller than a critical diameter. There is a difference between zirconium oxide particles which is constrained by the matrix of ceramics and zirconium oxide particles which is not constrained by the matrix of ceramics. In the case of zirconium oxide particles which is not constrained, for example, according to R. C. Garvie, J. Phys. Chem., Vol. 69, p 1238 (1965), the tetragonal phase is stable at 300 Ångströms or less. Accordingly, zirconium oxide of from 40 Ångströms to 80 Ångströms is naturally expected to be a tetragonal phase and the expected results were obtained.

The desired ranges of the contents of zirconium oxide present in the composite ceramic powders according to the present invention are from 10% to 25% by weight. When the amount of zirconium oxide is less than 10% by weight, zirconium oxide provides little toughness and the strength of molded sintered bodies is not sufficiently improved. When the amount of zirconium oxide is more than 25% by weight, a monoclinic phase tends to be formed. When the amount of zirconium oxide is 30% by weight or more, it is clearly recognized that monoclinic phase is formed by means of an X-ray diffraction.

In the meanwhile, the particle size of the composite ceramic powders can be controlled by the reaction time and other production conditions.

One embodiment of the method of making composite ceramic powders according to the present invention is described in conjunction with the drawings.

FIG. 1 is a view illustrating the scheme for producing composite ceramic powders. The apparatus shown in FIG. 1 comprises a reaction vessel 1, an evaporator 2 for aluminum halides, an evaporator 3 for zirconium halides, a scrubber 4 and a gas-liquid separator 5.

Both the evaporator 2 for aluminum halides and the evaporator 3 for zirconium halides are cylindrical. These evaporators are externally heated by means of an electric furnace 6. The inside diameter of the lower portion of the evaporators is smaller than that of the upper portion thereof. The lower portion having a smaller inside diameter is packed with inorganic material solid particles having a diameter of about 0.2 mm to about 1.0 mm. A carrier gas is blown in a direction 7 from the bottom of the evaporators to form a fluidized bed 8. Aluminum oxide, zirconium oxide, silica, mullite, glass beads and the like may be used as inorganic material solid particles. Aluminum oxide is the most preferred because the purity of powders which are products is retained and because aluminum oxide is easily available. It is desirable that inert gases such as nitrogen gas are used as the carrier gas. The aluminum halides and the zirconium halides can be continuously or intermittently (if so desired) fed from an inlet 9 of the evaporator 2 and an inlet 9 of the evaporator 3, respectively. The aluminum halides and the zirconium halides fed are in the form of granules or powders. Because the bulk specific gravity is smaller than that of particles of the fluid bed, the aluminum halides and the zirconium halides are fluidized at the upper portion of the fluidized bed and well contact the carrier gas which is blown up from the lower portion of the evaporator. The aluminum halides and the zirconium halides evaporate in an amount of a constant vapor pressure which corresponds to the operation temperature of the evaporator and leave the evaporator along with the carrier gas. A mixed gas containing gaseous aluminum halides and a mixed gas containing gaseous zirconium halides are each transferred to a gas mixer 12 through conduits 11 and 11' heated by a heater 10. In this gas mixer 12, two mixed gases are further mixed to form a mixed gas comprising aluminum halides, zirconium halides and carrier gas, and thereafter such a mixed gas is blown into the reaction vessel 1. The blend ratio of aluminum halides and zirconium halides can be adjusted depending upon the control of evaporating amount attributed to the operating temperatures of the evaporators 2 and 3, and the flow rates of the carrier gases. It is suitable that the flow rates of the carrier gases are the order of from 0.1 to 0.4N cubic meter per hour in this specific apparatus. Within this range, the flow rate of the carrier gas for aluminum halides and the flow rate of the carrier gas for zirconium halides may be identical or different. While the aluminum halides and the zirconium halides may be chlorides, bromides, iodides, fluorides and the like, the most preferred halides are chlorides. Bromides are also desirable because of equally less handling difficulty. Each Operating temperature of each of evaporators 2 and 3 is set at a temperature of the sublimation point or lower of the respective halide. For example, in the case of aluminum chloride, the temperature of the evaporator 2 is desirably the order of from 130° C. to 170° C. The temperature of the evaporator 3 for zirconium chloride is set so that a suitable blend ratio is obtained relative to the amount of aluminum chloride evaporated and the flow rate of the carrier gas.

When a blowing nozzle by which the mixed gas comprising aluminum halides, zirconium halides and carrier gas is blown into the reaction vessel, is exposed to high temperatures, aluminum oxide and zirconium oxide tend to be built up to occur blocking. Therefore, inert gases such as nitrogen are blown into the reaction vessel 40 from its periphery in a direction 13 in order to protect the blowing nozzle. Hydrogen and oxygen gases are blown into the upper portion of the reaction vessel 1 in directions 14 and 15, respectively, to form an oxyhydrogen flame. When the blowing angles of oxygen and hydrogen are horizontal and eccentric to the same direction so that an eddy is formed in such direction, good combustion can be carried out. Oxygen may be replaced with air, particularly preheated air or the like, and hydrogen may be replaced with hydrocarbon gases such as methane. The mixed gas comprising aluminum halides, zirconium halides and carrier gas is blown from the top of the reaction vessel into the middle of the flame, and the oxidation reaction occurs at a temperature of from 800° to 1900° C. Thus, ceramic powders consisting of two components, aluminum oxide and zirconium oxide are formed.

A mixture of ceramic powders and high temperature gas is quenched by a quenching gas blown at the lower portion of the reaction vessel in a direction 16 to stop the reaction. Nitrogen, steam, process off-gases (recycle gas) and the like are used as the quenching gas. The quenched mixed gas contacts water in a scrubber 4 and thus the resulting ceramic powders are miscible with water. Therefore, the ceramic powders are suspended in a liquid and remains in a gas-liquid separator 5. The gas leaving the gas-liquid separator 5 contains few ceramic particles.

A slurry 17 of water and ceramic powders is suitably withdrawn from the bottom of the gas-liquid separator 5. This slurry 17 is repeatedly subjected to centrifuge, water washing and the like, and thereafter dried to obtain composite ceramic powders. Water present in the lower portion of the gas-liquid separator is fed to the scrubber 4 by a pump 18 and repeatedly used. A process off-gas removed from the gas-liquid separator 5 to 19 contains some chlorine or hydrogen chloride gases and therefore is treated to remove harmful materials. Thereafter, the treated off-gas is discharged.

Zirconia dispersed ceramics can be obtained by using, as a raw material, composite ceramic powders according to the present invention wherein zirconium oxide (its crystallite phase is only tetragonal) is dispersed in fine particles of aluminum oxide, preparing a green compact therefrom, and sintering the compact. The zirconia dispersed ceramics may have significantly improved mechanical performances as compared with a molded sintered product of aluminum oxide alone or a molded sintered product obtained by separately preparing aluminum oxide powders and zirconium oxide powders and then mixing them. Thus, the zirconia dispersed ceramics obtained herein may be excellent hard materials for cutting tool and the like. It is believed that the major reason why mechanical strength improves is as follows: in the case of powders according to the present invention, zirconium oxide dispersed in fine particles of aluminum oxide is very fine and its crystalline phase is only tetragonal, and therefore in a molded sintered product obtained by using these powders, zirconium oxide can be uniformly and finely dispersed in aluminum oxide as well as liable to take a tetragonal symmetry which develops toughness, thereby the formation of monoclinic phase is inhibited.

Further, in this method of making composite ceramic powders according to the present invention, a mixed gas comprising aluminum halides, zirconium halides and carrier gas is preformed and then blown into a burner combustion chamber. Accordingly, the aluminum halides and the zirconium halides are simultaneously oxidized in a good mixing state and therefore it is possible to obtain particles exhibiting a uniform dispersion state. Further, the blend ratio of aluminum oxide and zirconium oxide can be readily adjusted by controlling the amount of aluminum halides and zirconium halides evaporated and the like.

Furthermore, in accordance with composite ceramic powders according to the present invention, zirconia dispersed ceramics wherein zirconium oxide is uniformly and finely dispersed can be produced in an easy operation.

EXAMPLE 1

Composite ceramic powders wherein zirconium oxide was finely dispersed in fine particles of aluminum oxide were produced according to the scheme as shown in FIG. 1 under the following production conditions.

| Production conditons: | |
| --- | --- |
| Temperature of evaporator for aluminum chloride | 150° C. |
| Carrier gas (nitrogen) for aluminum chloride | 0.4 N cubic meter per hour |
| Temperature of evaporator for zirconium chloride | 290° C. |
| Carrier gas (nitrogen) for zirconium chloride | 0.1 N cubic meter per hour |

-continued

| Production conditons: | |
|---|---|
| Gas (nitrogen) for protection of blowing nozzle | 0.2 N cubic meter per hour |
| Hydrogen for burner | 0.8 N cubic meter per hour |
| Oxygen for burner | 0.7 N cubic meter per hour |
| Reaction temperature (in consideration of heat loss) | 1,250° C. |

A powder product (120 grams) was obtained in one hour of the operation time. The composition of this powder product was 77.5% by weight of $Al_2O_3$ and 22.5% by weight of $ZrO_2$.

Figure 2:
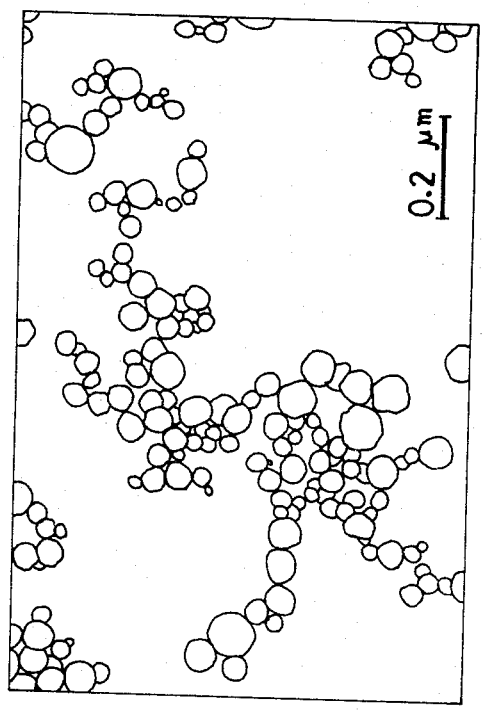
FIG. 2 is a transmission electron micrograph illustrating a particle structure of a composite ceramic powder which is one example of the present invention.
Figure 3:
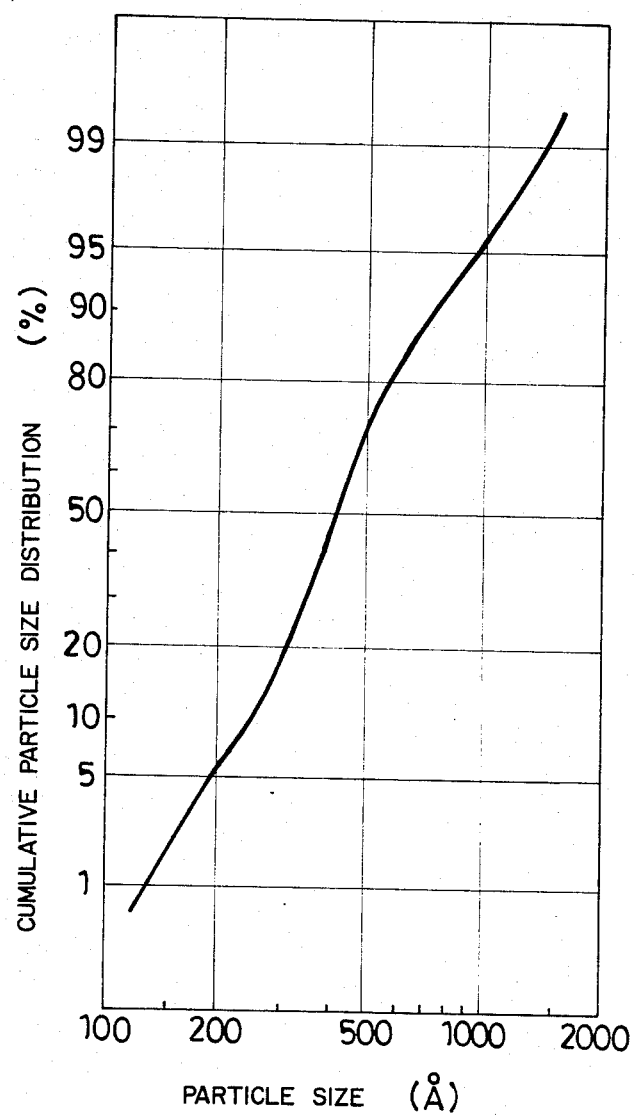
FIG. 3 is a graph illustrating the particle size distribution of the powders shown in FIG. 2.

A transmission electron micrograph of the resulting powders is shown in FIG. 2. As shown in the micrograph, the product is spherical powder having an average diameter of about 400 Ångströms. When the particle size distribution of powder is examined, no powders having 100 Ångströms or smaller and no powders having 2000 Ångströms or larger can be observed as shown in FIG. 3. If the range of from 10% to 90% of the cumulative particle size distribution is called particle size range, in this Example the particle size range is from 240 Ångströms to 700 Ångströms. When these powders were examined by means of a conventional X-ray diffraction method, the result as shown in FIG. 4 was obtained. For zirconium oxide, only tetragonal peaks were detected and monoclinic peaks were not detected. It is difficult to determine the crystalline phase of aluminum oxide by means of this X-ray diffraction method. It may be argued from the X-ray diffraction profile that the crystalline phase of aluminum oxide is close to an amorphous form, but peaks which possibly exhibit δ (delta)-phase are detected to some extent. Thus, it is estimated that aluminum oxide is amorphous or δ-aluminum oxide. It is estimated that the peaks of zirconium oxide are wide in width and that the particle size thereof is small. When Scherrer's formula is applied for the tetragonal (111) peak to calculate a crystallite diameter, the crystallite diameter of zirconium oxide is determined to be 62 Ångströms. According to the electron microscopic observation, the average particle size of powders was about 400 Ångströms and particles having a particle size of 100 Ångströms or less were seldom present. Accordingly, it is believed the small zirconium oxide crystallites are dispersed/present within particles of aluminum oxide having an average particle size of about 400 Ångströms.

Thus, according to the method of the present invention, it is possible to produce powders wherein zirconium oxide particles having a size of several tens of Ångströms are dispersed/within spherical aluminum oxide particles having a size of several hundreds of Ångströms. Those powders obtained were ideal raw material powders for zirconia dispersed ceramics because zirconium oxide is dispersed to improve toughness of the ceramics. These powders were subjected to a hot pressing/sintering process for 30 minutes at a temperature of 1550° C. to prepare a sintered body. When the bending strength of the sintered body was measured, the value of 76 kg/mm² was obtained.

EXAMPLE 2

Composite ceramic powders were produced in the same manner as described in Example 1 except that the temperature of the evaporator for zirconium chloride was 273° C. The content of zirconium oxide present in the resulting powders was 10.8% by weight. These powders were subjected to a hot pressing/sintering process for 30 minutes at temperature of 1550° C. to prepare a sintered body. When the bending strength was measured, the value was 58 kg/mm².

COMPARATIVE EXAMPLE

Composite ceramic powders were produced in the same manner as described in Example 1 except that the temperature of the evaporator for zirconium chloride was 301° C. The content of zirconium oxide present in these powders was 33.0% by weight. The X-ray diffraction pattern demonstrated that monoclinic peaks of zirconium oxide was slightly detected. The powders were subjected to a hot pressing/sintering process for 30 minutes at temperature of 1550° C., to form a sintered body, and its bending strength was measured.

Further, a sintered body was produced in the same sintering method from powders which consisted of aluminum oxide alone and which was free of zirconium oxide, and its bending strength was measured.

These results obtained are shown in table 1 in conjunction with the results of Examples 1 and 2 described above.

TABLE 1

| | Content of $ZrO_2$ (% by weight) | Bending strength (kg/mm²) |
|---|---|---|
| Comparative Example | 0 | 34 |
| Example 2 | 10.8 | 58 |
| Example 1 | 22.5 | 76 |
| Comparative Example | 33.0 | 30 |

As can be seen from Table 1, it is apparent that the strength increases with an increase in the content of zirconium oxide until the content of zirconium oxide is the order of about 25% by weight; that the effect is rapidly lost in an amount of about 33% by weight; that the addition of 33% by weight of zirconium oxide at which monoclinic zirconium oxide is formed provides lower strength than that of aluminum oxide alone; and that powders containing zirconium oxide which exhibits only a tetragonal system are excellent.

What is claimed is:

1. Composite ceramic spherical powders comprising fine particles of aluminum oxide and zirconium oxide dispersed within said fine particles of aluminum oxide wherein the average particle size of said fine particles of aluminum oxide is from 200 to 1000 Ångströms, the crystalline phase of said zirconium oxide exhibits only a tetragonal symmetry and the crystallite diameter of zirconium oxide is from 40 to 80 Ångströms on the basis of the calculation of the width of a peak of an X-ray diffraction, and wherein the content of zirconium oxide is from 10% to 25% by weight.

2. The composite ceramic powders according to claim 1 wherein said aluminum oxide is amorphous.

3. The composite ceramic powders according to claim 1 wherein said aluminum oxide is δ (delta)-aluminum oxide.

* * * * *